(12) United States Patent
Pagot et al.

(10) Patent No.: US 8,020,461 B2
(45) Date of Patent: Sep. 20, 2011

(54) TRAVEL DRIVE SYSTEM FOR HYBRID VEHICLE AND METHOD USING SAME

(75) Inventors: Alexandre Pagot, Rueil Malmaison (FR); Stéphane Venturi, Roiffieux (FR)

(73) Assignee: Institut Francais du Petrole, Cedex (FR)

( * ) Notice: Subject to any disclaimer, the term of this patent is extended or adjusted under 35 U.S.C. 154(b) by 958 days.

(21) Appl. No.: 11/923,772

(22) Filed: Oct. 25, 2007

(65) Prior Publication Data

US 2008/0108476 A1 May 8, 2008

(30) Foreign Application Priority Data

Oct. 26, 2006 (FR) ...................................... 06 09491

(51) Int. Cl.
*F16H 3/22* (2006.01)
(52) U.S. Cl. .......................................................... 74/342
(58) Field of Classification Search ................ 74/665 C; 903/912
See application file for complete search history.

(56) References Cited

U.S. PATENT DOCUMENTS

| 7,610,891 B2* | 11/2009 | Seufert et al. ............ 123/179.25 |
| 2002/0189397 A1* | 12/2002 | Sakamoto et al. .............. 74/661 |
| 2006/0276289 A1* | 12/2006 | Hirata et al. ...................... 475/5 |

FOREIGN PATENT DOCUMENTS

| EP | 1 122 109 A2 | 8/2001 |
| WO | WO 2005/100777 A2 | 10/2005 |

OTHER PUBLICATIONS

International Search Report, FRX 0609491, May 29, 2007.

* cited by examiner

*Primary Examiner* — David D Le
*Assistant Examiner* — Erin D Bishop
(74) *Attorney, Agent, or Firm* — Antonelli, Terry, Stout & Kraus, LLP.

(57) ABSTRACT

A travel drive system for a hybrid vehicle includes a thermal engine with an engine output shaft carrying a clutch, a driven shaft connected to said clutch and linked to a speed variation means, at least one electric machine with a rotor, and a motion transmission chain between speed variation means and wheels of the vehicle, said chain comprising an output shaft for the speed variation means and a motive axle connected to said output shaft. The system includes a disengageable coupling between one of the elements of the transmission chain and rotor of electric machine, and another disengageable coupling between output shaft of thermal engine and said rotor.

6 Claims, 1 Drawing Sheet

TRAVEL DRIVE SYSTEM FOR HYBRID VEHICLE AND METHOD USING SAME

FIELD OF THE INVENTION

The present invention relates to a drive system, traction or propulsion drive, for hybrid type vehicles.

This type of vehicles generally combines a thermal engine, mainly an internal-combustion engine, and an electric machine connected to an electric source, such as one or more electric accumulators, for propelling them. This combination allows the energy efficiency of the drive system to be optimized while decreasing the total fuel consumption and limiting emissions.

BACKGROUND OF THE INVENTION

In the example described in document FR-2,670,440, the thermal engine comprises an output shaft that drives the motive part of a variable transmission, such as a variable speed drive, and whose transmission receiving part is connected to the motive axle of the vehicle. The output shaft carries, between the thermal engine and the variable speed drive, an electric machine connected to an electric battery and two clutches, a first clutch between the thermal engine and the electric machine, and a second clutch between the electric machine and the variable speed drive.

When the vehicle is to be driven with a high torque over a wide speed range while limiting exhaust gas and noise generation, as in an urban site, the electric machine is preferably used for driving the motive axle of the vehicle.

On the other hand, for uses where a high engine driving power and a wide operating range are required, the thermal engine is used for driving the motive axle and thus providing displacement of the vehicle.

Although satisfactory, this drive system however involves some significant drawbacks.

In fact, when only the electric machine is used to drive the vehicle, it must have a sufficient torque and/or power for driving the vehicle as well as overcoming all the resistances (inertia, friction, . . . ) of the variable transmission. Furthermore, during vehicle braking operations, part of the energy released thereby is consumed by the variable speed drive and only another part of this energy is recovered, then converted by the electric machine.

If a mechanical gearbox is used instead of the variable speed drive, it is essential to change the gear ratio in order to recover the braking energy. It is therefore necessary to disengage the motive axle, which causes a break in the motion transmission and an interruption of the braking energy recovery.

The present invention aims to overcome the aforementioned drawbacks by means of a simple drive system that requires no complicated control devices for the various uses of the system.

SUMMARY OF THE INVENTION

The invention therefore relates to a travel drive system for a hybrid vehicle, comprising a thermal engine with an engine output shaft carrying a clutch, a driven shaft connected to said clutch and linked to a speed variation means, at least one electric machine with a rotor, and a motion transmission chain between the speed variation means and the wheels of the vehicle, said chain comprising an output shaft for the speed variation means and a motive axle connected to said output shaft, characterized in that it comprises a disengageable coupling between one of the elements of the transmission chain and the rotor of the electric machine, and another disengageable coupling between the output shaft of the thermal engine and said rotor.

The two disengageable couplings can be operational alternately.

The disengageable couplings can be geared couplings.

The rotor of the electric machine can carry a coupling part operational with another part of one or the other coupling.

The rotor of the electric machine can carry a pinion that is axially mobile along said rotor.

The motive axle can carry a toothed wheel connected in rotation to said axle so as to cooperate with the pinion to form a disengageable coupling.

The gearbox output shaft can comprise a toothed wheel cooperating with the pinion so as to form a disengageable coupling.

The output shaft can carry a toothed wheel connected in rotation to said shaft and arranged between the thermal engine and the clutch, to cooperate with the pinion so as to form another disengageable coupling.

The drive system can comprise means for controlling the motion of the pinion.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
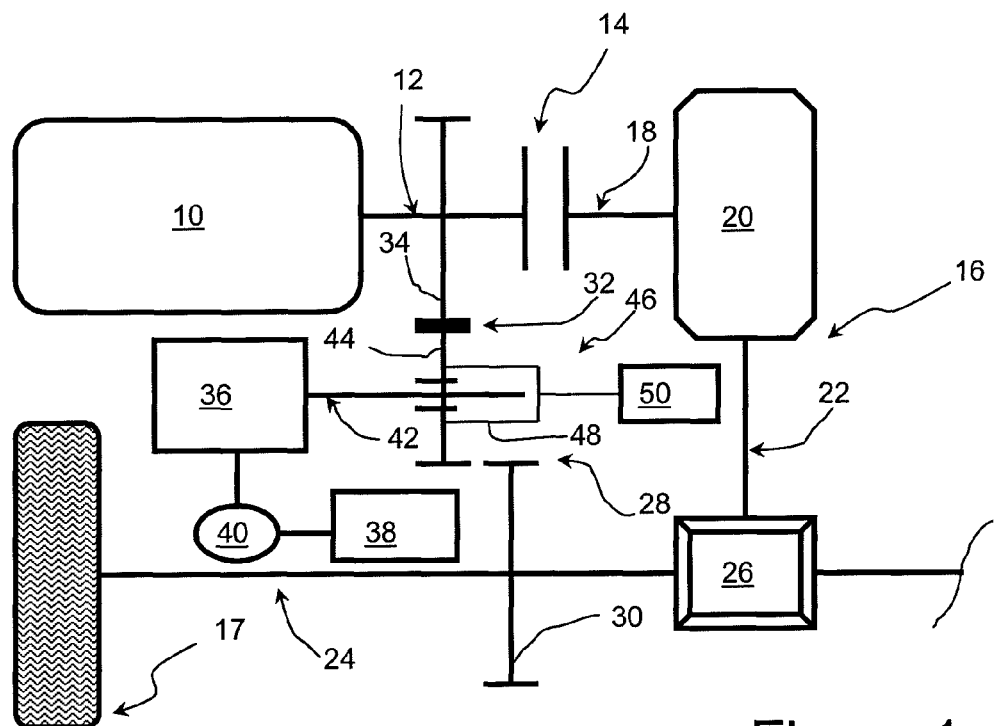
FIG. 1 is a diagram showing a drive system for a hybrid vehicle according to the invention, for a first configuration.

In these figures, the system for driving a hybrid vehicle comprises a thermal engine 10, notably an internal-combustion engine, with an engine output shaft 12 provided with a clutch 14 connected to a driven shaft 18 linked to a variable transmission 20 such as an automated gearbox, this driven shaft being used as the gearbox input shaft. A motion transmission chain 16 is provided between this gearbox and wheels 17 of the vehicle. This chain comprises a plurality of elements, with an output shaft 22 of the gearbox connected to a motive axle 24, directly or by means of a transmission 26, such as a differential axle, that drives the wheels of the vehicle. The motive axle also comprises one of the parts of a first disengageable coupling 28 that is, in the example shown, a toothed wheel 30 of a geared coupling.

Gearbox 20 can thus be uncoupled from engine shaft 12 by means of clutch 14 placed on this shaft and controlled by any known means. One of the parts of a second disengageable coupling 32, preferably a toothed wheel 34 of a geared coupling, is arranged on the engine shaft and between clutch 14 and engine 10.

The drive system also comprises an electric machine 36 fed by electric accumulators 38 (or batteries) and controlled by a control element 40. Machine 36 comprises a rotor 42 carrying the other part of the couplings, here a sliding pinion 44, suited to mesh with toothed wheel 34 of the engine shaft or toothed wheel 30 of the motive axle. This pinion therefore slides axially on the rotor between these two positions under the action of a control means 46, such as a fork 48 controlled by a jack 50, preferably of electromagnetic type. Furthermore, this pinion can be put, under the action of the control means, into a position referred to as neutral position where it is free of any gearing with toothed wheels 30, 34. Thus, the first coupling consists of toothed wheel 30 meshing with pinion 44 and the second coupling consists of toothed wheel 34 also meshing with pinion 44.

For operation according to the configuration of FIG. 1 where thermal engine 10 is used for driving the vehicle by its motive axle 24, electric machine 36 is used, in a first stage, for providing engine start-up, then it can be used as a current generator for supplying the various devices and accessories of the vehicle and/or for recharging the batteries of the vehicle.

In the first stage, clutch 14 is actuated so as to disconnect engine output shaft 12 from input shaft 18 of gearbox 20 and jack 50 controls fork 48 in such a way that pinion 44 is put in the active position where it meshes (or engages) with toothed wheel 34 of engine output shaft 12. Once this layout obtained, control element 40 of machine 36 allows electric power supply to this electric machine via batteries 38 so as to drive in rotation rotor 42, and consequently pinion 44. Under the effect of this gearing, engine shaft 12 is driven in rotation and, as soon as the conditions for combustion are met in engine 10, the latter starts. In this case, the electric machine plays the part of a conventional electric starter.

Preferably, after start-up of engine 10, coupling between engine shaft 12 and rotor 44 is maintained throughout operation of the thermal engine that drives the motive axle by means of the gearbox and of the axle. In this layout, the rotor of the electric machine is driven in rotation by shaft 12 and this machine works like a power generator that is used for recharging the batteries and/or for supplying the accessories and/or the elements of engine 10 and/or of the vehicle.

Figure 2:
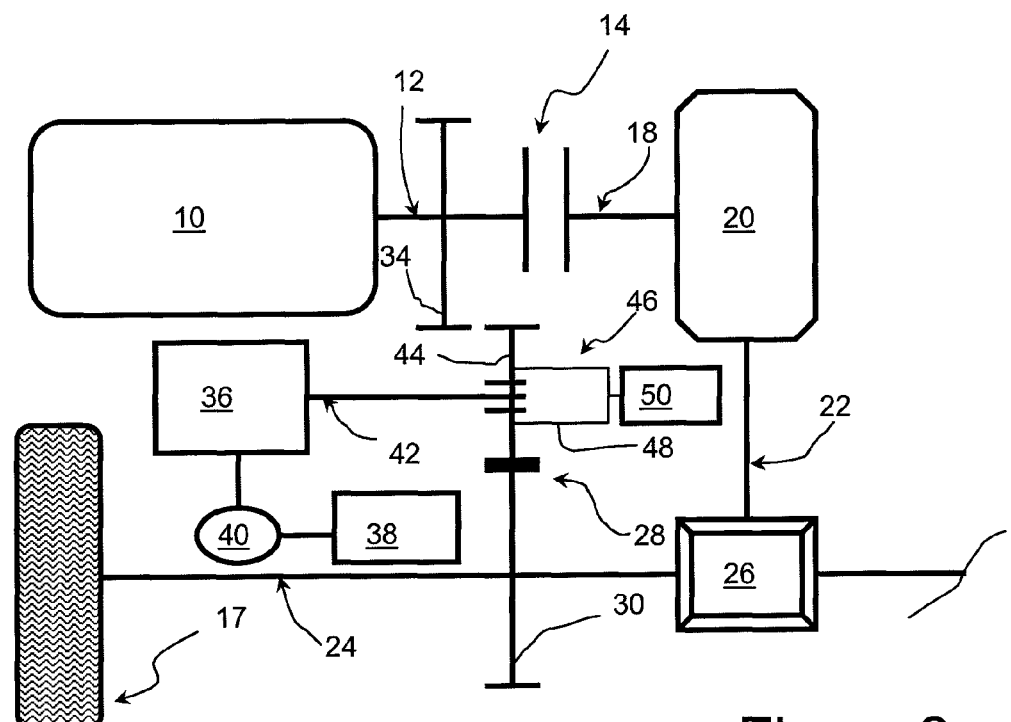
FIG. 2 shows the system of FIG. 1 in a second configuration.

In the other configuration illustrated by FIG. 2, only electric machine 36 is used for driving motive axle 24, and thermal engine 10 is inactive. This machine is therefore fed by batteries 38 and control device 40 controls the rotating speed of rotor 42. The axial displacement of pinion 44 is then controlled by control means 46 consisting of jack 50 and fork 48 from its meshed position with toothed wheel 34 shown in FIG. 1, for gearing with toothed wheel 30 arranged on the motive axle so as to engage coupling 30.

Furthermore, upon vehicle braking, it is advantageously possible to recover this braking energy by means of machine 36 that is then no longer a motive machine but a machine receiving a mechanical energy that, as in the case of an electric generator, will be converted to electric energy in order to be used or stored in batteries 38.

In a variant for starting the thermal engine while the vehicle is moving under the action of an electric motor, it is possible to use the configuration of FIG. 2 where pinion 44 is engaged with the toothed wheel meshed with motive axle 24.

In this configuration, a gear ratio is engaged and clutch 14 is in the uncoupled position. Control element 40 allows electric power supply to this electric machine via batteries 38 so as to drive in rotation rotor 42, and consequently pinion 44 and toothed wheel 30. Under the effect of this gearing, motive axle 24 is driven in rotation, as well as gearbox output shaft 22 through differential axle 26. This rotating motion is then transmitted to gearbox input shaft 18 through the gearbox. By acting upon clutch 14 so as to cause sliding between the two parts of this clutch, then coupling thereof, engine output 12 is driven in rotation. As soon as the conditions for combustion are met in the combustion chambers of this engine 10, the engine starts.

Preferably also, after engine 10 has started, coupling between motive axle 24 and rotor 42 is maintained throughout operation of the thermal engine and the electric machine works like a power generator upon rotating motion of the motive axle for displacement of the engine by the thermal engine.

Thermal engine start-up can also be provided by means of the same process as described above, but by coupling up pinion 44 and a toothed wheel carried by gearbox output shaft 22.

Of course, without departing from the scope of the invention, it is possible to simultaneously use the electric motor and the thermal engine for driving in rotation the motive axle, the powers of these two engine types combining in the two configurations illustrated in FIGS. 1 and 2.

The present invention is not limited to the example described above and it encompasses any variant or equivalent.

Notably, couplings 28, 32 can be provided with any device ensuring gearing of pinion 44 with toothed wheels 30, 34, such as synchromesh assemblies, more commonly referred to as synchro assemblies.

Similarly, the thermal engine mentioned in the above description covers internal-combustion engines running on fossil fuels such as gasoline, diesel fuel or gas, as well as biofuels of ethanol type or others.

The invention claimed is:

1. A travel drive system for a hybrid vehicle, comprising;
  a thermal engine with an engine output shaft carrying a clutch,
  a driven shaft connected to said clutch and linked to a speed variation means,
  at least one electric machine with a rotor,
  a motion transmission chain between said speed variation means and wheels of the vehicle, said chain comprising an output shaft for the speed variation means and a motive axle connected to said output shaft for the speed variation means,
  a first disengageable coupling between one of the elements of the transmission chain and said rotor of said at least one electric machine, the first disengageable coupling comprising a pinion axially mobile along said rotor and a first part provided on said one element of said transmission chain and said rotor and engageable with said pinion, and
  a second disengageable coupling between said output shaft of said thermal engine and said rotor, the second disengageable coupling comprising said pinion and a second part provided on said engine output shaft and engageable with said pinion.

2. A drive system as claimed in claim 1, characterized in that the first and the second disengageable couplings are operational alternately.

3. A drive system as claimed in claim 1, characterized in that the first and the second disengageable couplings are geared couplings.

4. A drive system as claimed in claim 1, characterized in that said one element of said transmission chain comprises said motive axle, and said first part comprises a first toothed wheel connected in rotation to said axle so as to cooperate with paid pinion to form the first disengageable coupling.

5. A drive system as claimed in claim 1, characterized in that said second part comprises a second toothed wheel connected in rotation to said engine output shaft and arranged between the thermal engine and the clutch, to cooperate with said pinion so as to form the second disengageable coupling.

6. A drive system as claimed in claim 1, further comprising means for controlling the motion of said pinion.

* * * * *